March 18, 1924.  1,487,361

L. POLINKOWSKY

MACHINE SWITCHING TELEPHONE EXCHANGE SYSTEM

Filed Feb. 24, 1919    8 Sheets-Sheet 1

Inventor:
Lipa Polinkowsky
by J. C. Roberts Att'y.

March 18, 1924.

L. POLINKOWSKY 1,487,361

MACHINE SWITCHING TELEPHONE EXCHANGE SYSTEM

Filed Feb. 24, 1919     8 Sheets-Sheet 4

Inventor:
Lipa Polinkowsky
by J.E.Roberts
Att'y.

March 18, 1924.

L. POLINKOWSKY 1,487,361

MACHINE SWITCHING TELEPHONE EXCHANGE SYSTEM

Filed Feb. 24, 1919    8 Sheets-Sheet 5

Inventor:
Lipa Polinkowsky
by J.E.Roberts Att'y.

March 18, 1924.

L. POLINKOWSKY 1,487,361

MACHINE SWITCHING TELEPHONE EXCHANGE SYSTEM

Filed Feb. 24, 1919　　8 Sheets-Sheet 6

Inventor:
Lipa Polinkowsky.
by J.B.Roberts Att'y

March 18, 1924.

L. POLINKOWSKY 1,487,361

MACHINE SWITCHING TELEPHONE EXCHANGE SYSTEM

Filed Feb. 24, 1919  8 Sheets-Sheet 8

Inventor:
Lipa Polinkowsky
by J.G.Roberts Att'y.

Patented Mar. 18, 1924.

1,487,361

UNITED STATES PATENT OFFICE.

LIPA POLINKOWSKY, OF NEW YORK, N. Y., ASSIGNOR TO WESTERN ELECTRIC COMPANY, INCORPORATED, OF NEW YORK, N. Y., A CORPORATION OF NEW YORK.

MACHINE-SWITCHING TELEPHONE-EXCHANGE SYSTEM.

Application filed February 24, 1919. Serial No. 278,575.

*To all whom it may concern:*

Be it known that I, LIPA POLINKOWSKY, a citizen of Russia, residing at New York, in the county of New York and State of New York, have invented certain new and useful Improvements in Machine-Switching Telephone-Exchange Systems, of which the following is a full, clear, concise, and exact description.

This invention relates to machine switching telephone exchange systems, and more particularly to telephone exchange systems of the full automatic type.

A feature of the invention is the provision of means for the control of the fundamental circuit extended over a two-wire trunk line which serves to prevent the closure of the fundamental circuit on the outgoing end of the trunk line until the switch is ready to extend the fundamental circuit on the incoming end and conversely to prevent the closure of such circuit at the incoming end until it is ready at the outgoing end to control the next selecting operation.

Another feature of the invention and one relating to the above is the provision of means for holding the fundamental circuit open at the automatic register set of the first exchange until the group selector at the second exchange associated with the incoming end of the trunk line has found a free succeeding selector and which prevents this group selector from extending the fundamental circuit to the succeeding selector until the register set is ready to control the setting up of the succeeding selector.

A further feature of the invention is the provision, in a system where a selective switch is arranged to operate under the control of a register set to extend a plurality of different classes of talking connections, of an auxiliary switch for said selective switch which assumes one of a plurality of different talking positions depending upon the class of the call.

Other features of the invention will sufficiently appear from the description of the operation of the circuits and apparatus, in the embodiment of the invention shown in the accompanying drawings.

Figure 1:
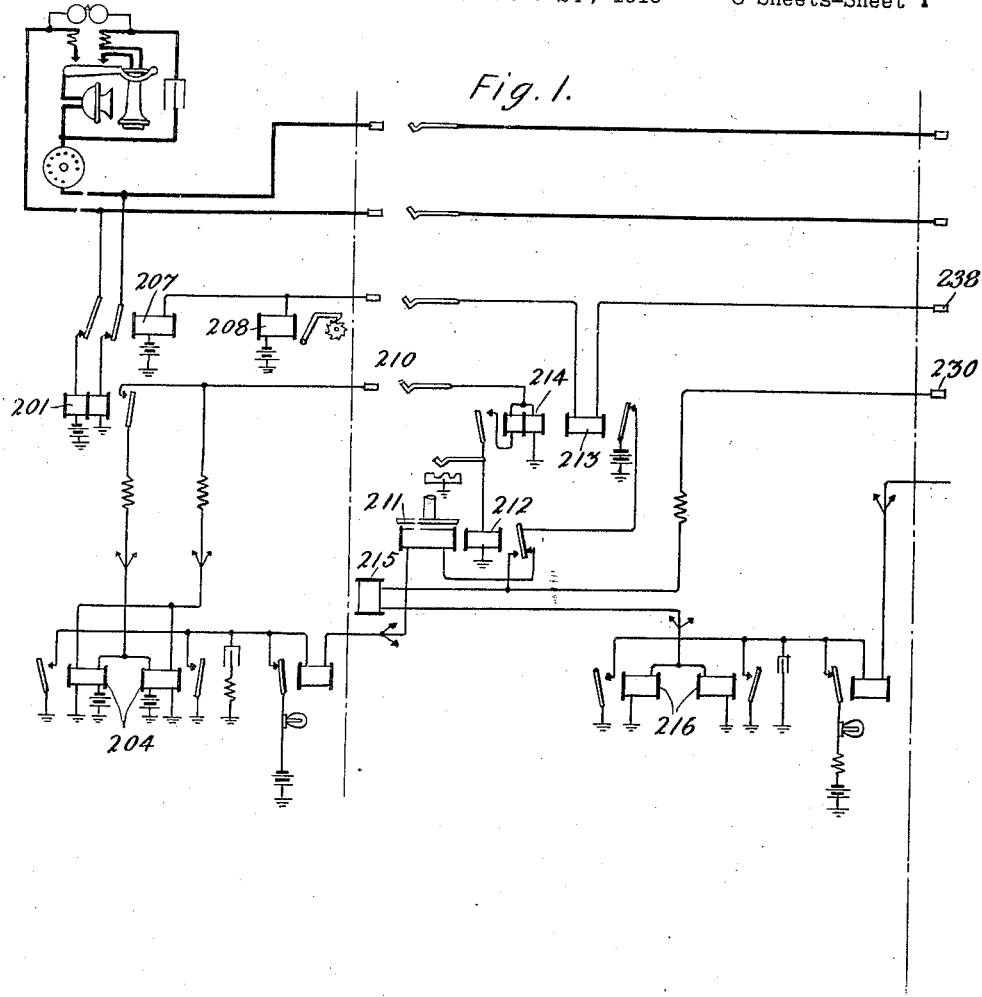
Figure 1 shows a subscriber's line and a first line finder.

The system disclosed as embodied in the present invention will be best understood from a description of the operation thereof.

The operation of the circuit of the first line finder, the cord and the final selector is briefly such that, when a line relay 201 is energized, the common starting relays 204 provide a circuit for the energization of the power magnets 211 of the free first line finders in the group. The brush carriages of the free first line finders rotate and in reaching terminal 210 of the calling line, test relay 214 of a line finder is energized and the terminal 210 is made busy through the connection of the low resistance winding of relay 214 and the winding of relay 212 in parallel to the high resistance winding of relay 214. Relay 212 disconnects the power magnet 211 and provides a circuit for the energization of the holding magnet 215 and the common starting relays 216. The brush carriage of the first line finder is arrested, and a circuit is provided for the free second line finders which have access to this first line finder. The second line finders are divided in pairs and when the cords are free the corresponding sequence switches 220 are held either in position 18 or position 1. Only the line finder of a cord on which the sequence switch 220 is in position 1 is able to search for a calling first line finder. Relay 222 of the cord is then energized in a circuit over the front contacts of the common starting relays 216. The power magnet 221 is then energized in a circuit over the front contact of relay 222 and back contact of relay 232 and the brush carriage of the second line finder rotates. On reaching terminal 230 the test relay 234 is energized, relay 232 is brought into the same circuit, terminal 230 is made busy, and relay 232 when energized causes the energization of sequence switch 220 in a circuit over front contacts of relays 232 and 222. Sequence switch 220 starts from position 1 and moves into position 4. When sequence switch 220 passes position 2, the high resistance winding of relay 234 is disconnected at sequence switch contact 227 bottom, and the energization of relay 234 is maintained over its low resistance winding. In position 3 of sequence switch 220 a circuit is established for the energization of relay 235 of the cord, relay 213 of the first line finder and cut-off relay 207 of the calling line, whereby relay 201 is deenergized and the brush carriages of the remaining free first and second line finders are arrested. The release relay 231 together with retardation coil 237 is brought into connection with the calling line.

In position 4 of sequence switch 220 the searching sequence switch 280 of the cord is energized and a free register set searched for. Assuming the register set in Figs. 3 and 4 free, a connection with this register is obtained as soon as sequence switch 280 reaches position 1 or 7. Relays 234 and 232 are thereby energized in a circuit over conductor 293, contact 322 top of sequence switch 320 and left-hand winding of relay 323. Sequence switch 280 is arrested whereas sequence switch 220 is advanced into position 5. The calling subscriber's line is brought into connection with the secondary winding of dialling tone coil 324 and the stepping relay 325 of the register set. Relay 323 when energized provides over its front contact and right-hand winding a circuit for the energization of sequence switch 320, which controls the connection of the registers in succession in a circuit which is under the control of the stepping-in relay 325. Sequence switch 320 starts from position 1 and moves into position 3. In positions 2 and 3 of this sequence switch the primary winding of the dialling tone coil 324 is connected over sequence switch contact 332 in a circuit with an interrupter 333 and the calling subscriber when receiving the sharp dialling tone winds up the dial to send the first figure of the wanted number. When sequence switch 320 reaches position 3 relay 323 is deenergized and relay 326 energized in a circuit over back contact of relay 323 and sequence switch contact 327 bottom. The ten thousands register 100 is energized in a circuit over sequence switch contact 328 top, back contact and right-hand winding of relay 329, sequence switch contact 330 top and front contacts of relays 326 and 325. Relay 329 remains thereby deenergized since its left-hand differentially wound winding is connected in a parallel circuit over retardation coil 331. Register 100 starts from position 0 and in closing its local contact 101 provides a shunt around the right-hand winding of relay 329, which is then energized and in opening its back contact disconnects the register. Relay 329 remains energized until the line circuit is opened at the dial and relay 325 is deenergized. Relay 329 in closing its back contact again prepares the circuit for register 100 which receives current as soon as relay 325 is again energized. Over the back contact of relay 329 is also connected in parallel to the register the relay 337, which when energized maintains over its front contact the closure of the circuit for relay 329. Relay 337 remains energized until the register reaches its next position and its local contact is opened. On the last interruption at the dial relay 325 remains deenergized for a comparatively long time and the slow operating relay 334 is energized in a circuit over sequence switch contact 342, bottom, and back contact of relay 325. Relay 323 is then energized in a circuit over front contact of relay 334. Sequence switch 320 is again energized, starts from position 3 and moves into position 5. Relay 325 is thereby again energized over the calling line before sequence switch 320 reaches position 4½. When the sequence switch passes into position 4 an additional energization of register 100 is provided in a circuit over sequence switch contact 330 bottom, the ten thousand register is then disconnected and the circuit is prepared for the thousand register 110 over sequence switch contact 328 bottom. Relay 326 is deenergized during the time sequence switch 320 moves between positions 3 to 5, and the first energization of register 110 takes place immediately the front contact of relay 326 is closed. Register 110 starts from position 0 and in closing contact 111, the right-hand winding of relay 329 is short-circuited and relay 329 opens its back contact, and the register completes its step under the control of its contact 111 and is arrested in position 1. Relay 337 is now connected in parallel to register 110 and maintains the energization of relay 329 during the time contact 111 is closed. When the dial is released a second time register 110 is brought to a position corresponding to the figure dialled and sequence switch 320 is advanced from position 5 into position 8 in which the hundreds register 120 is connected in the stepping circuit over sequence switch contact 335 top, and is set up according to the third set of impulses from the dial. Sequence switch 320 is then advanced from position 8 into position 10 in which the tens register 130 is connected in the stepping circuit over sequence switch contact 335 bottom, after which sequence switch 320 is advanced from position 10 into position 12 in which the units register 140 is connected in the stepping circuit over sequence switch contact 336. When the dialling is completed sequence switch 320 is advanced from position 12 into position 14.

The capacity of the exchange is assumed to be twenty-thousand lines. First and second group selectors and final selectors are therefore provided. The register 100 registers the odd and even ten thousands whereas the thousands register 110 controls the selection of the corresponding level at the first group selector. The position of the registers determines the translation from the decimal number system of the wanted subscriber line to the system of the switches and register 100 determines the translation for the first group selector. The setting up of the first group selector takes place during the time the subscriber continues the dialling, and the operation of the trip spindle of the first group selector is delayed until the first two impulse series are completed on the dial. This corresponds to sequence switch 320 leaving position 5. In position 6 of sequence switch 320 a circuit is closed for the energization of sequence switch 350 over contact 352 top, back contact of relay 353, contact 103 of register 100 and contact 338 top of sequence switch 320. Sequence switch 350, which controls the connection of the registers in succession for the control of the fundamental circuit of the selectors, starts from position 1 and under the control of its local contact 351 moves into position 3. In position 2 of sequence switch 350 the right-hand winding of relay 359 is energized in a circuit over back contact of stepping-out relay 355 and sequence switch contact 354. Relay 359 keeps open, at its back contact, the circuit for re-setting the registers.

Assuming that the number of the wanted line is 12453. When the dial is wound up to digit 1 and then released, the register 100 makes nine steps under the control of the dial and one step under the control of contact 330 bottom. The register 100 is therefore again in its position 0. On the second digit register 110 has been energized eight times under the control of the dial and is therefore in position 8. When sequence switch 350 reaches position 3 the fundamental circuit is closed over contact 356 top of sequence switch 350, back contact of relay 357, winding of stepping-out relay 355, contact 358 bottom of sequence switch 350, common wire 296 and winding of relay 222. Both relays 222 and 355 are energized. Sequence switch 220 starts from position 5 and moves into position 6 in which the trip spindle magnet 248 is energized. The trip spindle rotates and produces at its contact 250, top, short-circuitings around the winding of relay 355. As soon as the back contact of relay 355 is closed the register 110 is energized in a circuit over left-hand back contact of relay 360, contact 113 of register 110, contact 361 top of sequence switch 350, back contact and left-hand winding of relay 359, back contact of relay 355 and sequence switch contact 354. Simultaneously with the energization of register 110 relay 362 is also energized and provides over its front contact a bridge to the contact of relay 355. Relay 362 in the circuit for the outgoing impulses serves the same purpose as relay 337 in the circuit of the incoming impulses and enables a safe operation of the register. Register 110 starts from position 8 and moves into position 9. In the meantime trip spindle contact 250 has been opened, the stepping relay 355 leaves its back contact, and relay 359 is deenergized. On the following closure of contact 250 relay 355 is again deenergized and register 110 is energized, starts from position 9 and moves into position 0. On the following deenergization of relay 355 the right-hand winding of relay 357 is energized in a circuit over sequence switch contact 363 top, contact 104 of register 100, contact 114 of register 110, contact 364 bottom and contact 361 top of sequence switch 350, back contact and left-hand winding of relay 359 and back contact of relay 355. Relay 357 opens the fundamental circuit. In parallel to the right-hand winding of relay 357 the sequence switch 350 is also connected and is energized, starts from position 3 and moves into position 4.

When contact 351 is closed and the left-hand winding of relay 359 is short-circuited, this relay is energized and maintains its energization over back contact of relay 355. After contact 250 of the trip spindle is opened, relay 222 is deenergized. Sequence switch 220 starts from position 6 and moves into position 7 in which the test relay 234 is connected with the test brush 252 of the first group selector. Relay 222 is now energized in a circuit over conductor 293, back contact of relay 339 and contacts 340 top of sequence switch 320. The power magnet 241 of the group selector brush carriage is energized in a circuit over front contact of relay 222. The brush carriage rotates, in the well-known manner, the brushes moving along the terminal row determined by the position of the trip spindle. In reaching the test terminal leading to a free second group selector, relay 234 is energized in a circuit over test brush 252, contact 401 of sequence switch 420 individual to the second group selector and resistance 402. In parallel to resistance 402 a high resistance release relay 403 is also connected. Relay 234 brings its low resistance winding and the winding of relay 232 in parallel to its high resistance winding, and makes the terminal of the group selector busy. Relay 232 is energized, the power magnet 241 is disconnected, sequence switch 220 and the holding magnet 245 of the first group selector are energized, the brush carriage is arrested, and sequence switch 220 starts from position 7 and moves over position 8 into position 9 in which the fundamental circuit is prepared on sequence switch contacts 247 top and 255 bottom to the second group selector pending the closure of the fundamental circuit at the register set.

Sequence switch 350 remains in position 4 until the third series of impulses at the dial has been completed and sequence switch 320 has left position 8. A circuit is then established for the energization of sequence switch 350 over contact 363 bottom and contact 338 bottom of sequence switch 320. Sequence switch 350 starts from position 4 and moves into position 6. The fundamental circuit containing relay 422 of the second group selector is now closed over contact 404 of sequence switch 420, contact 247 of sequence switch 220, contact 286 of sequence switch 280, conductor 296, contact 358 bottom of sequence switch 350, relay 355, back contact of relay 357, contact 356 bottom of sequence switch 350, right-hand back contact of relay 365, conductor 297, contact 287 of sequence switch 280, contact 255 of sequence switch 220 and contact 405 of sequence switch 420. Both relays 355 and 422 are energized. Relay 359 is deenergized. Sequence switch 420 is energized in a circuit over its contact 406 and front contact of relay 422. Sequence switch 420 starts from position 1 and moves into position 2 in which the trip spindle magnet 403 is energized in a circuit over sequence switch contact 407 and front contact of relay 422. The trip spindle rotates and provides at contact 410 top over sequence switch contact 409 short-circuitings in the fundamental circuit. The resistance 402 is disconnected at contact 401 from terminal 252 in position 2 of sequence switch 420, and the high resistance relay 403 is left alone in the circuit which includes the test terminal. Relay 234 is deenergized and opens its left-hand winding, while relay 403 remains energized over the right-hand winding of relay 234.

When relay 355 is deenergized register 120 is energized in a circuit over contact 122, contact 366 bottom of sequence switch 350 and back contact of relay 359. Register 120 starts from position 6 and moves into position 7, and when register 120 reaches position 0 under the control of relay 355 the register is disconnected, and on the following deenergization of relay 355 a circuit is established over contact 124 of register 120, contacts 361 bottom and 364 bottom of sequence switch 350, contact 114 of register 110, contact 104 of register 100 and sequence switch contact 363 top for the energization of relay 357 and sequence switch 350. The fundamental circuit is opened at the back contact of relay 357 and sequence switch 350 starts from position 6 and moves into its position 9. As soon as contact 410 of the trip spindle is also opened, relay 422 is deenergized and sequence switch 420 is energized in a circuit over its contact 411 top and back contact of relay 422. Sequence switch 420 starts from position 2 and opens the fundamental circuit on the group selector at contacts 404 and 405, contact 404 being opened before contact 358 top of sequence switch 350 is closed. Sequence switch 420 moves into position 5 in which the left-hand high resistance winding of relay 434 is connected over sequence switch contact 413 bottom with the test brush 412. The power magnet 431 of the brush carriage is thereby energized in a circuit over sequence switch contact 414 bottom and back contact of test relay 432. The brush carriage rotates moving the brushes along the terminal row determined by the position of the trip spindle. In reaching the terminals of a free final selector relay 434 is energized in a circuit over brush 412, contact 441 of sequence switch 450 individual to the final selector, and through resistance 442. A high resistance relay 443 is also connected in the circuit. Relay 434 brings its right-hand low resistance winding over its front contact and winding of relay 432 in connection with brush 412 and makes the test terminal to this final selector busy, relay 432 in energized, disconnects at its back contact power magnet 431 and provides a circuit for the energization of sequence switch 420 over contact 406 top and front contact of relay 432. In parallel to the sequence switch over contact 411 bottom is connected the holding magnet 435 of the selector, the brush carriage is arrested and sequence switch 420 starts from position 5 and moves into position 10 in which the fundamental circuit is extended over sequence switch contacts 415 and 416 to the final selector. Terminal 412 is now connected over sequence switch contact 413 top direct with the winding of relay 432, so that the right-hand winding of relay 434 is short-circuited and this relay is deenergized.

Sequence switch 350 remains in position 9 until the tens and units registers have been set up under the control of the dial and sequence switch 320 has moved into position 14 in which sequence switch 350 is energized in a circuit over contact 352 top, right-hand back contact of relay 353 and contact 341 bottom of sequence switch 320. Sequence switch 350 starts from position 9 and moves into position 10 in which the fundamental circuit is closed at the register set over right-hand back contact of relay 378 and sequence switch contact 379 top. Relay 452 at the final selector and relay 355 at the register set are energized. Relay 359 is deenergized. A circuit is closed for the energization of sequence switch 450 over front contact of relay 452 and contact 490 bottom. Sequence switch 450 starts from position 1 and moves into position 2 in which the trip spindle magnet 448 is energized in a circuit over front contact of relay 452. The trip spindle rotates and provides at its contact 455 top short-circuitings of the fundamental circuit.

When relay 355 is deenergized, register 130 is energized in a circuit over contact 132, contact 367 top of sequence switch 350 and back contact of relay 359. Register 130 starts from position 5 and moves into position 6. After register 130 is restored to position 0 under the control of relay 355 a circuit is established on the following deenergization of relay 355 over contact 134 of register 130 and contact 352 of sequence switch 350 for the energization of the sequence switch and relay 357. The fundamental circuit is thereby opened and sequence switch 350 starts from position 10 and moves into position 12. After contact 351 is opened relay 357 is deenergized and the fundamental circuit is again closed at its back contact. When contact 455 of the trip spindle is also opened relay 452 is deenergized and sequence switch 450 is energized in a circuit over back contact of relay 452 and contact 491 top. Sequence switch 450 starts from position 2 and moves into position 5. The duration of the opening of the fundamental circuit at back contact of relay 357 is so selected that contact 447 of sequence switch 450 is opened before relay 452 can be energized a second time over the fundamental circuit whereas the energization of this relay takes place before sequence switch 450 reaches position 5. The power magnet 461 of the brush carriage is now energized in a circuit over contact 492 top and the front contact of relay 452. The brush carriage rotates moving the brushes along the sixth terminal row and a series of short-circuitings of the stepping relay 355 in the fundamental circuit is again produced at contact 457 top of the brush carriage.

When the relay 355 is deenergized a circuit is established for the energization of register 140 over contacts of relays 355 and 359, contact 367 bottom of sequence switch 350 and contact 142 of units register 140. After register 140 reaches position 0 under the control of relay 355 a circuit is established for the energization of sequence switch 350 and relay 357 at the following deenergization of relay 355 over contact 143 of register 140, back contact of relay 374, contact 144 of register 140 and contact 352 bottom of sequence switch 350. The fundamental circuit is again opened and sequence switch 350 starts from position 12 and moves over positions 15, 16 and 17 (as will be hereinafter described) into position 1. In position 13 of sequence switch 350 a circuit is established for the energization of relay 339 over contact 368 bottom of sequence switch 350, left-hand back contact of relay 365 and sequence switch contact 369. The energization of relay 339 causes the deenergization of relay 222 in the cord, whereby sequence switch 220 starts from position 9. In position 10 of the sequence switch 220 the fundamental circuit of the register set is disconnected. Supervisory relay 262 and retardation coil 257 are connected to the final selector. When sequence switch 220 leaves position 9 the subscriber's line is again connected with relay 231 and retardation coil 237. In position 10 sequence switch 220 is energized in a circuit over back contact of relay 262. Sequence switch 220 moves over position 10 into position 11.

As soon as relay 325 at the register set is deenergized sequence switch 320 is energized in a circuit over contact 348 bottom and back contact of relay 325. Sequence switch 320 starts from position 14 and moves into position 15. When sequence switch 350 reaches position 1 a circuit is established for the energization of relay 323 over contact 322 bottom of sequence switch 320 and contact 369 bottom of sequence switch 350. Sequence switch 320 is again energized over front contact of relay 323, starts from position 15 and moves into position 17 in which relay 334 is energized in a circuit over sequence switch contact 342 top, back contact of relay 326 and sequence switch contact 340 bottom. Relay 323 is again energized over front contact of relay 334, sequence switch 320 is energized over front contact of relay 323 and starts from position 17 and moves into position 1.

After the fundamental circuit has been opened at the register set the relay 452 is deenergized as soon as contact 457 top is opened, the power magnet 461 is disconnected and sequence switch 450 is energized in a circuit over back contact of relay 452. The holding magnet 465 is connected in parallel to the sequence switch. The brush carriage is arrested and sequence switch 450 starts from position 5.

When the sequence switch of the final selector reaches position 8 the wanted line undergoes a test and the right-hand high resistance winding of test relay 464 is connected in a circuit over the cut-off relay of the wanted line. If the line is free relay 464 brings into circuit over its front contact, its left-hand low resistance winding together with winding of relay 462 in parallel to its high resistance winding. The terminal of the wanted line is so made busy whereas relay 462 is energized. Sequence switch 450 in reaching position 10 is energized in the circuit over front contact of relay 462 and moves over positions 10 and 11 into position 12 in which an alternating ringing current is immediately sent to the station of the wanted line. Relay 452 is brought into connection with a common interrupter 469, which when closed causes the energization of said relay which at its front contact completes a circuit to move sequence switch 450 into position 13, in which relay 452 is connected with a further common interrupter 472. The two interrupters 469 and 472 are continuously operated and are arranged to close the circuit to ground at predetermined intervals so that after the sequence switch 450 reaches position 12 it is brought, after the lapse of a few seconds, over positions 12 and 13 into position 14.

When sequence switch 450 reaches position 14 the direct connection of the ringing current is removed and the connection of the subscriber's line alternately with the source of ringing current and ground is maintained over for the usual intervals by means of interrupter 474. During the time sequence switch 450 is in positions 12 to 14 the primary winding of tone coil 477 is connected to a common interrupter, and the secondary windings of coil 477 are connected in bridge to the line. The calling subscriber perceives an indication that the ringing of the called party is proceeding. As soon as at the wanted station the receiver is lifted from the hook the ringing relay 460 is energized and causes over its front contact the energization of sequence switch 450 which starts from position 14 and moves into position 15 in which a through connection of the called subscriber line is made to the transmitter current supply bridge at the first group selector. Relay 262 is energized. Sequence switch 220 starts from position 11 and moves into position 12.

Figure 2:
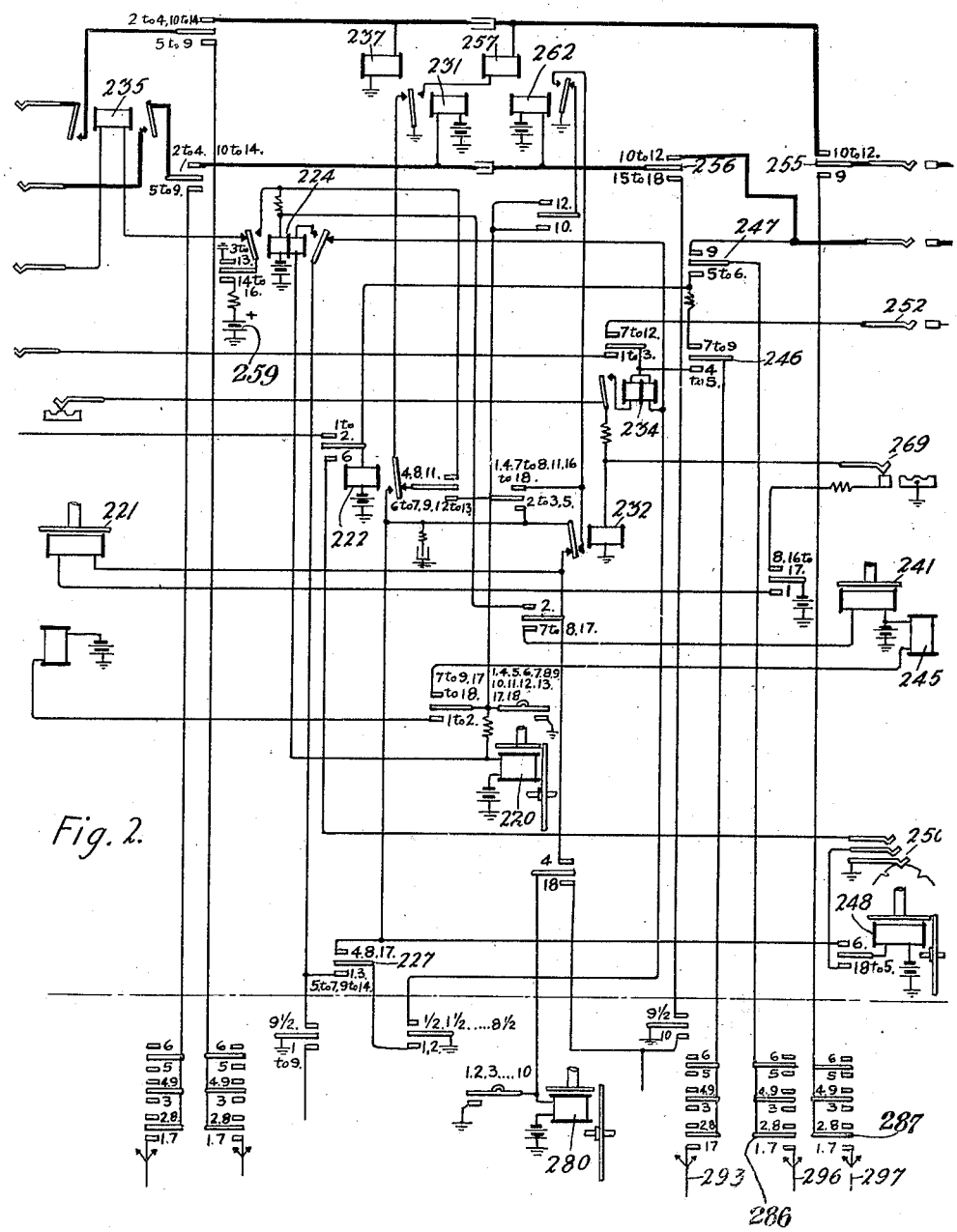
Figure 2 shows a cord circuit comprising a second line finder and a first group selector.
Figure 6:
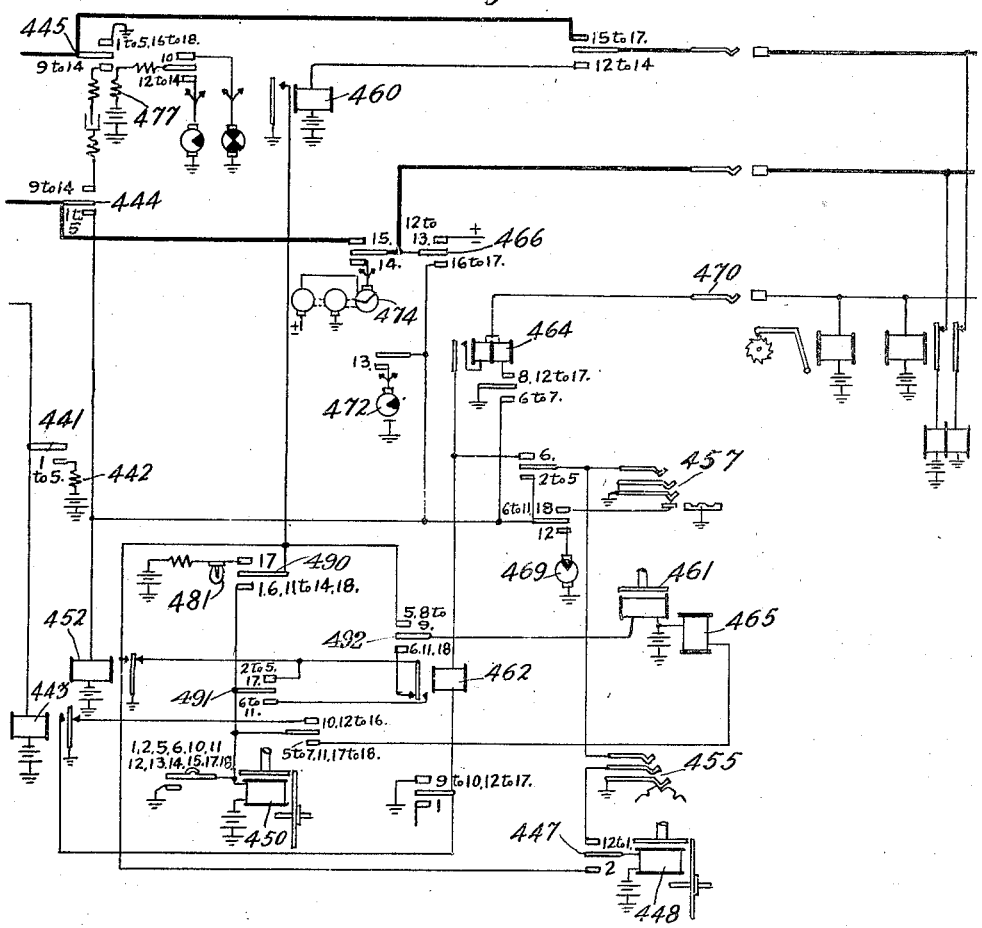
Figure 6 shows a final selector.
Figure 7:
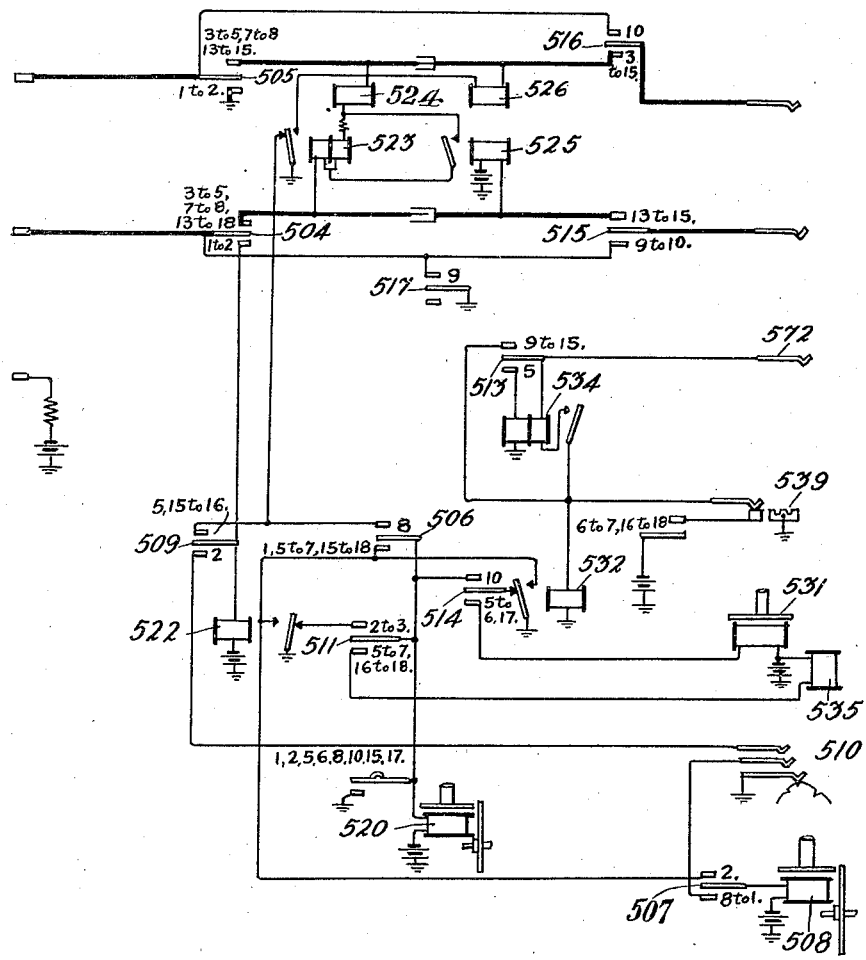
Figure 7 shows a second group selector on the incoming end of a two-wire trunk line.

If the number of the wanted subscriber begins with the figure 2 and the wanted number is, for example, 22453, the ten-thousands register 100 is finally set in position 9. When the fundamental circuit is closed over relay 222 of the first group selector the thousands register 110 is first restored to position 0 and then the ten-thousands register 100. The trip spindle of the first group selector makes an additional step. The brush carriage of the first group selector searches now in an even level for a free trunk line to a distant exchange. On the incoming end of the trunk line is provided a second group selector as shown in Figure 7. The fundamental circuit when extended to the first group selector over the sequence switch contacts 247 and 255 is closed on the distant end of the two-wire trunk line at the contacts 504 and 505 through relay 522 of the second group selector to ground. Sequence switch 520 is thereby energized over contact 506 and front contact of relay 522, starts from position 1 and moves into position 2 in which the trip spindle 508 is energized in a circuit over sequence switch contact 507 top and front contact of relay 522. The trip spindle rotates and at its contact 510 top over sequence switch contact 509 bottom provides short-circuitings for the fundamental circuit. After the fundamental circuit is opened both at the register set and at contact 510 of the trip spindle, relay 522 is deenergized and sequence switch 520 is energized in a circuit over contact 511 top and back contact of relay 522. Sequence switch 520 starts from position 2 and moves into position 5 in which the power magnet of the brush carriage 531 is energized in a circuit over sequence switch contact 514 bottom and back contact of test relay 532. The left-hand high resistance winding of the other test relay 534 is thereby connected over sequence switch contact 513 bottom to test brush 572. The brush carriage rotates moving the brushes along the terminal row determined by the position of the trip spindle and searches for a final selector such as shown in Figure 6. When the final selector has been found relay 534 is energized and the test terminal of the final selector is made busy. Also relay 532 is energized and sequence switch 520 is energized in a circuit over contact 506 bottom and front contact of relay 532. During the time sequence switch 520 remains in position 5 both windings of the release control relay 523 together with the retardation coil 524 are brought in bridge of the trunk line over sequence switch contacts 504 top and 505 top.

Sequence switch 350 at the register set in the exchange, after the control of the fundamental circuit for the second group selector is completed, moves as has been described into position 9. A circuit is established over sequence switch contact 358 top and 356 top through relay 377 which together with relay 523 in the distant exchange, is energized in a metallic circuit over the trunk line before sequence switch 350 reaches position 8. Relay 353 is energized in a circuit over front contact of relay 377 and contact 370 of sequence switch 350. Relay 353 maintains its energization over its left-hand front contact independent of sequence switch contacts 370 and opens on its righthand back contact the connection with sequence switch contact 352 so that sequence switch 350 is disconnected in position 9. When the sequence switch 520 on the second group selector in the distant exchange is energized over front contact of relay 532 and leaves position 5, the circuit over the trunk line is opened at the sequence switch contacts 505 and 504 during the time sequence switch 520 moves over position 6. In positions 7 and 8 of sequence switch 520 the circuit including relay 523 is again closed. The opening of the trunk line causes the deenergization of relay 377 and in consequence of relay 353, but as soon as the trunk line is again closed relay 523 is again energized, sequence switch 520 is arrested in position 8 and remains there waiting until sequence switch 350 of the register set becomes energized in the circuit over contact 341 of sequence switch 320, which can take place when the dialling has been completed and sequence switch 320 is advanced into position 14. When sequence switch 350 leaves position 9 the circuit containing the battery and relay 377 is broken at contact 358 top and 356 top. Relay 523 is deenergized and sequence switch 520 is energized in a circuit over its contact 506 top and back contact of relay 523.

Sequence switch 520 starts from position 8 and moves into position 10. When passing position 9 a circuit is closed for the energization of relay 452 of the final selector over contact 444 of sequence switch 450, contact 515 bottom and contact 517 of sequence switch 520 so that relay 452 causes the energization of sequence switch 450 and its starting from position 1. Sequence switch contact 516 is closed before sequence switch contact 517 is opened and the circuit is extended to the relay 355 of the register set in the exchange after which the final selector is set up under the control of the tens and units register, as has been described, and it has been secured that the second group selector on a two-wire trunk cannot produce the starting impulse for the sequence switch of the final selector unless the register set is ready to control the final selector, while the register set prevents the preparation of the fundamental circuit until a free trunk line to a final selector has been selected. When the sequence switch 450 of the final selector leaves position 5, resistance 442 is disconnected at contact 441 and the high resistance winding of relay 443 is left alone in the circuit of relay 532, which is thereby deenergized. Sequence switch 520 is thereby energized in a circuit over contact 514 top and back contact of relay 532. Sequence switch 520 starts from position 10 and moves into position 15 in which relay 523 is again brought in bridge to the trunk line, while supervisory relay 525 together with retardation coil 526 is brought over sequence switch contacts 515 and 516 in connection with the final selector.

The closure of contacts 368 bottom of sequence switch 350 on the register set is so timed that sequence switch 220 of the cord is advanced into position 10 after the sequence switch of the final selector has left position 5 and has opened its contacts 444 and 445, while sequence switch 220 reaches position 10 before sequence switch 520 of a group selector on the end of a two-wire trunk reaches its position 15 so that relay 523 is energized in a metallic circuit over relay 262 and retardation coil 257. When the called subscriber answers and the sequence switch of the final selector moves into position 15 the transmitter current supply to the calling station is provided over relay 525 and retardation coil 526, and relay 525 is energized and provides a shunt around the high resistance winding of relay 523. Relay 262 is thereby energized and sequence switch 220 advances into position 12.

If the second figure of the wanted number is odd, the first group selector is set up to a level as if the lower even figure has been dialled, whereas the second group selector is advanced to another level producing thereby the second translation on the switches. Assuming that the number of the wanted subscriber was 13453, register 110 receives seven impulses and is arrested in position 7. When sequence switch 350 moves over position 2 relay 360 is energized in a circuit over contact 116 of register 110, contact 371 bottom and contact 351 of sequence switch 350. Relay 360 maintains its energization over its right-hand front contact and sequence switch contact 372 top. Over the left-hand contact of relay 360 the circuit for register 110 is so modified that this register when under the control of the stepping relay 355 is arrested in position 9 instead of position 0. The circuit therefore when next closed extends over back contacts of relay 355 and relay 359, contact 361 of sequence switch 350 and contact 113 of register 110, left-hand front contact or relay 360, contact 115 of register 110 and contact 104 of register 100 to the sequence switch 350 and relay 357. The trip spindle of the first group selector takes therefore the same position whether numeral 2 or numeral 3 has been dialled for the second figure of the wanted subscriber's number. After sequence switch 350 leaves position 3 relay 360 is deenergized and when in position 6 of the sequence switch 350 the register 120 is brought to position 0 under the control of relay 355, the circuit at contact 124 of register 120 is first extended over sequence switch contact 361, contact 112 of register 110 and back contact of relay 360 to the register 110 which on the following deenergization of relay 355 is restored to its position 0 while the next subsequent deenergization of relay 355 causes the opening of the fundamental circuit. Each time the second digit dialled is odd the trip spindle of the second group selector makes therefore an additional step.

If the third digit of the wanted number is odd, as for example the number 12553, register 120 receives from the dial five impulses and is arrested in position 5. When sequence switch 350 moves over position 4½ relays 373 and 374 are energized in a circuit over contact 375 top of sequence switch 350 and contact 126 of register 120 whereby relay 373 provides a locking circuit over its front contact and sequence switch contact 372 bottom. After the units register 140 has been set up the energization of relays 373 and 374 is maintained over contact 146 of register 140 and contact 369 of sequence switch 350. When sequence switch 350 passes over position 5 register 120 is energized in a circuit over its contact 122, contact 366 top of sequence switch 350 and contact 126 of register 120. Register 120 makes an additional step and takes the same position as if the next lower even digit had been dialled. The trip spindle of a second selector takes therefore the same position disregarding whether the third figure of the wanted number was even or odd, and relay 374 controls the translation for the units of the final selector, causing the advance of the brush carriage to the second half of the terminal row.

When the brush carriage of a final selector moves between the first and second half of the terminal arc, the short-circuiting contact 457 of the brush carriage is in the well-known manner closed for a comparatively longer time and if the wanted number corresponds to the first terminal in the second half of a terminal arc, the long closure of contacts 457 is delaying the starting of sequence switch 450 and opening of contact 444. In order that the sequence switch 220 of the cord shall not move into position 10 before contact 444 is opened at a final selector, the circuit at the register is so arranged that if the wanted number is the first in the second half of the terminal arc of a final selector, the energization of relay 339 and in consequence the deenergization of relay 222 is correspondingly delayed. The first terminal on the second half of the terminal arc corresponds to an odd position of register 120 and 0 position of register 140. If therefore relay 373 has been energized on an odd position of register 120 and if register 140 has received ten impulses from the dial and is arrested in its position 0, a circuit is closed in position 10 of sequence switch 350 for the energization of relay 365 over contact 145 of register 140, contact 375 bottom of sequence switch 350, front contact of relay 373 and sequence switch contact 372 bottom. Relay 365 once energized maintains its energization over its left-hand front contact and sequence switch contact 369 bottom. When after the completion of the selection sequence switch 350 reaches position 13, the circuit for relay 339 is maintained opened at the left-hand back contact of relay 365 and this circuit is closed in position 14 of sequence switch 350 over the sequence switch contact 368 top, front contact of relay 365 and sequence switch contact 369.

When after a conversation the calling subscriber restores his receiver on the hook, relay 231 is deenergized and sequence switch 220 starts from position 12 and moves over position 13 into position 17. When the sequence switch 220 moves over positions 14 to 16, the metering battery 259 is connected to terminal 238, whereby the meter 208 at the calling subscriber line is operated. In position 17 of sequence switch 220 the magnet 241 is energized and the brush carriage rotates until its home contact 269 is reached, when relay 232 is energized in a circuit over contact 269. The brush carriage is arrested and sequence switch 220 starts from position 17 and moves into position 18.

Figure 5:
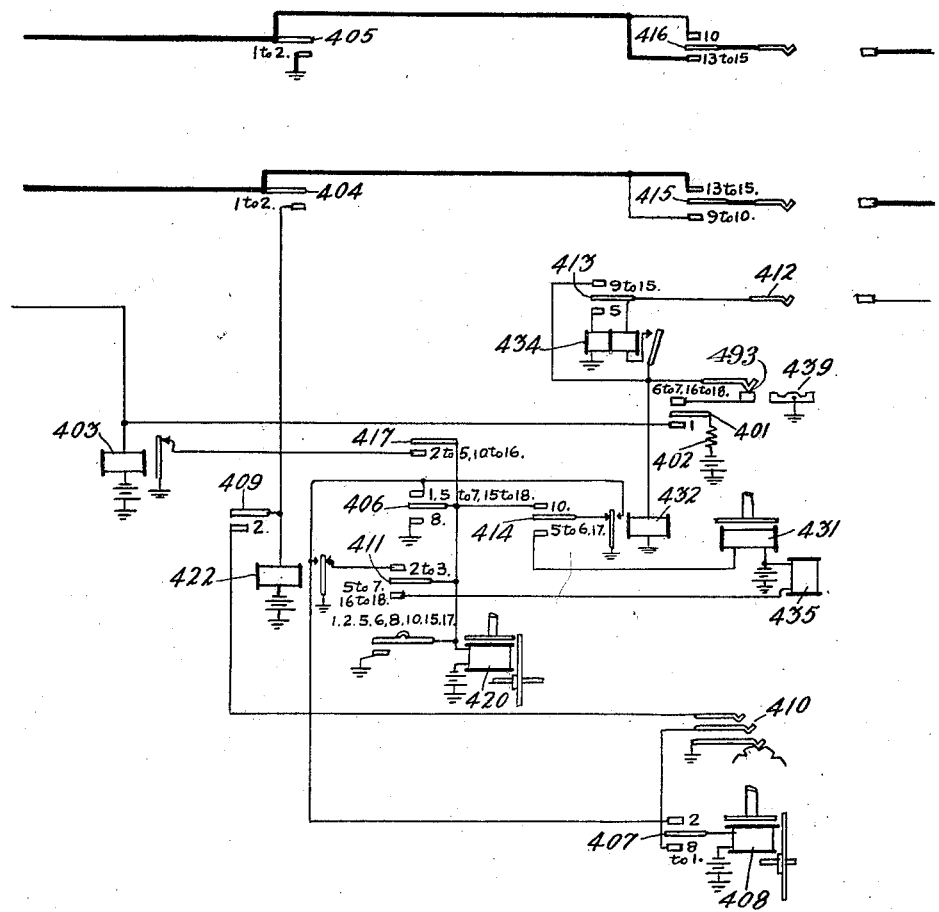
Figure 5 shows a second group selector for local connections.

After sequence switch 220 leaves position 12 the brushes of the first group selector are disconnected. If the connection has been established over a local second group selector, as shown in Figure 5, relay 403 is deenergized and sequence switch 420 is energized in a circuit over sequence switch contact 417 and back contact of relay 403. Sequence switch 420 starts from position 10 and moves over position 15 into position 17 in which power magnet 431 is again energized in the circuit over sequence switch contact 414 and back contact of relay 432, and the brush carriage of the group selector is restored to its position of rest, and when the home contact 493 is closed, relay 432 is energized in a circuit over contact 439 and sequence switch contact 401 top. The power magnet 431 is disconnected on the back contact of relay 432 and sequence switch 420 is energized in the circuit over the front contact of this relay. In parallel to sequence switch 420 is connected over its contact 411 the holding magnet 435, the brush carriage is arrested whereas sequence switch 420 starts from its position 17 and moves into its position 1.

After sequence switch 420 leaves position 15 and its contact 413 top is opened, relay 443 at the final selector is deenergized and sequence switch 450 starts from position 15 and moves into position 17. Relay 452 is brought over sequence switch contact 466 bottom in connection with the called line, and if the called subscriber has not restored his receiver to the hook relay 452 is energized, sequence switch 450 is held in position 17 and lamp 481 displays a guarding signal. When the called subscriber has restored his receiver, relay 452 is deenergized and sequence switch 450 starts from position 17 and moves into position 18 in which the brush carriage rotates until its home contact 457 bottom is closed, whereupon relay 452 is energized; the brush carriage is arrested and sequence switch 450 starts from position 18 and moves into position 1.

If the connection has been established over a two-wire trunk to a distant exchange, the selector shown in Figure 7 has been used, and relay 523 on the selector is deenergized as soon as front contact of relay 231 is opened in the outgoing exchange. Relay 522 is thereby energized in a circuit over sequence switch contact 509 top and back contact of relay 523. Sequence switch 520 is then energized in the circuit over contact 506 bottom and front contact of relay 522. Sequence switch 520 starts from position 15 and moves into position 17 in which the brush carriage is restored to its position of rest, after which sequence switch 520 moves into position 1. A comparison of the second group selectors in Figure 5 and in Figure 7 will show that the contacts of the sequence switches 520 and 420 have the same arrangement and that only the circuit of the selector is modified, so that a local second group selector can at any time if needed be converted into a two-wire trunk group selector and vice versa.

After a release of a connection sequence switch 220 of the cord remains in position 18 until the second cord of the pair of cords is engaged in a call.

If the called subscriber is the first to restore his receiver on the hook, relay 262 in the cord is deenergized and sequence switch 220 is energized in a circuit over back contact of relay 262. Sequence switch 220 starts from position 12 and moves into position 13. The circuit over the brushes of the first group selector is thereby disconnected, the second group selector and the final selector are released, and the sequence switch of the cord remains in position 13 with the calling line held busy until the calling subscriber restores his receiver and relay 231 is deenergized.

If the wanted line has been found busy and the test relays 464 and 462 have not been energized when sequence switch 450 of the final selector moves over position 8, the sequence switch 450 is arrested in position 10. The secondary winding of the busy tone coil 477 is thereby brought in bridge to the line and the calling subscriber receives a busy tone. When the subscriber restores his receiver and relay 231 is deenergized a circuit is established for the energization of the left-hand winding of meter-hindering relay 224. Relay 224 disconnects at its left-hand back contact the circuit for relays 235, 213 and 207, and a holding circuit is provided over the left-hand front contact of relay 224 for its left-hand winding. Over the right-hand front contact of relay 224 and its right-hand low resistance winding, a circuit is established for the energization of sequence switch 220. Sequence switch 220 starts from position 11 and moves over positions 12 and 13 into position 17. After the disconnection of the group selector the second group selector is released, as has been described, relay 443 at the final selector is deenergized and sequence switch 450 starts from position 10 and moves into position 11 in which the brushes are restored to their position of rest, whereafter contact 457 bottom is closed, relay 452 is energized. Sequence switch 450 starts from position 11 and moves into position 1.

Since sequence switch 220 is held in position 11 whether the wanted line is busy or a ringing current is sent to the wanted station, relay 224 is energized if the calling subscriber gives up the connection before the called subscriber has answered. The release proceeds therefore without metering if the sequence switch of the final selector is in its ringing position and the called subscriber does not answer.

A connection can be immediately released at any stage of the progress of the selection. Briefly stated, the operation is such that on a release started before the cord obtains a connection with a free register set, the meter-hindering relay 224 is energized and frees the calling line, sequence switch 220 is held in position 4 until sequence switch 280 reaches a free register set and relays 234 and 232 are energized, or until sequence switch 280 passes position $9\frac{1}{2}$ and sequence switch 220 is energized in a circuit over contact 289 of sequence switch 280 and right-hand front contact of relay 224. Sequence switch 220 then completes its rotation. When the release is started as soon as sequence switch 220 is in position 5 and before the fundamental circuit is closed at the register set, relay 339 is energized in a circuit over back contact of the stepping relay 325 when sequence switch 320 passes position $4\frac{1}{2}$. Relay 222 is thereby energized in a circuit over the right-hand front contact of relay 339 and contact 376 of sequence switch 350. Sequence switch 220 is moved into position 6 and as soon as contact 376 is opened and relay 222 is deenergized, the sequence switch 220 leaves position 6 and completes its rotation. When a release is started and relay 222 is deenergized at the time sequence switch 220 is in position 9, the sequence switch moves over positions 9 and 10 into position 11 in which relay 224 is energized. In all these premature releases the operation of the meter 208 on the calling line is prevented through the disconnection of the metering battery 259 at the left-hand back contact of relay 224.

When the release is started before the dialling is completed, relay 339 is energized in one of the positions $4\frac{1}{2}$, $7\frac{1}{2}$, $9\frac{1}{2}$, or $11\frac{1}{2}$ of sequence switch 320, and when the connection is given up at the calling subscriber's station after the wanted number has been dialled but before the selection is completed, sequence switch 320 is energized in position 14 over contact 348 bottom and back contact of relay 325. In position 15 relay 339 is energized in the circuit over sequence switch contact 348 top and back contact of relay 325, so that relay 222 in the cord is deenergized. During the premature release of the register set sequence switch 350 is moved without delay over the positions in which the fundamental circuit of the selectors can be closed. When sequence switch 320 reaches position 15 sequence switch 350 is energized in a circuit over contact 371 top and contact 346 bottom of sequence switch 320. Sequence switch 350 moves from the position in which the premature release started over position 12 into position 15 in which a check is made to determine whether or not the registers 120, 110 and 100 are in their positions of rest. At contact 343 of sequence switch 320 the back contact of relay 359 is connected to ground and the circuit is established for the resetting of the registers, should they not be in position 0, over contact 343 of sequence switch 320, contact 366 of sequence switch 350 and contact 122 of register 120. After register 120 reaches position 0 a circuit is extended over contact 124 of register 120 and contact 361 of sequence switch 350 to register 110 and after this register is in its position 0 the circuit is extended over contact 364 of sequence switch 350, contact 114 of register 110 to register 100. After this register is in position 0 the circuit is extended over contact 104 and sequence switch contact 363 to sequence switch 350. Sequence switch 350 then starts from position 15 and moves into position 16 in which a check is made to determine whether or not the tens register 130 is in position 0, and a circuit is established over contact 343 of sequence switch 320, contact 367 of sequence switch 350 and contacts 132 of register 130. After this register is in position 0, the circuit is extended to sequence switch 350 which is then energized over contact 252 and contact 134 of register 130. Sequence switch 350 starts from position 16 and moves into position 17 in which a check is made to determine whether or not the units register 140 is in position 0. A circuit is established over contact 343 of sequence switch 320 and contact 367 bottom of sequence switch 350 to register 140. When register 140 is in position 0 the circuit is extended over contact 143, back contact of relay 374, contact 144 of register 140 to sequence switch contact 352. Sequence switch 350 starts from position 17 and moves into position 1 in which relay 323 is energized, as has been described.

When a release is started and relay 222 is deenergized at a stage in which sequence switch 220 of the cord is in position 7, relay 224 is energized as soon as sequence switch 220 reaches position 8. The sequence switch remains in position 8 until the brush carriage is restored to its position of rest. Relay 222 remains connected over sequence switch contact 246 top to conductor 293. It is therefore desirous that the register set shall not be given free and shall not be taken for a new call until contact 246 of the cord which has been released is opened. If the sequence switch 320 reaches position 17 before contact 246 of sequence switch 220 is opened, a circuit is established for the energization of relay 326 over back contact of relay 323, contact 327 top of sequence switch 320, wire 293, contact 246 top of sequence switch 220 and winding of relay 222. Sequence switch 320 is held in position 17 until relay 326 is deenergized.

When a release is started during the progress of a selection on which a local second group selector, as shown in Figure 5, is used, relay 403 is deenergized as soon as relay 224 is energized and its right-hand back contact is opened. When the release is started at the time the fundamental circuit is closed on the register set for the setting up of the trip spindle of the second selector, sequence switch 350 is in position 6 and the left-hand winding of relay 357 is energized in a circuit over contact 376 bottom of sequence switch 350 and right-hand front contact of relay 339. The fundamental circuit is opened at the back contact of relay 357, relay 422 at the second group selector is deenergized and sequence switch 420 starts from position 2. Before sequence switch 420 reaches position 5, relay 222 in the cord is already energized and relay 403 is deenergized. In position 5 of sequence switch 420 its energization is maintained over back contact of relay 403, whereby the holding magnet 435 is also energized and the brush carriage is held in position of rest. In position 6 of sequence switch 420 relay 432 is energized in the circuit over the home contact 439, and the energization of sequence switch 420 is maintained in position 6 over front contact of relay 432. Sequence switch 420 then completes its rotation and is arrested in position 1. If the release is started and relay 403 becomes deenergized at the time sequence switch 420 is in position 5 in which the circuit for searching of a free terminal to a following selector is closed, sequence switch 420 is energized over back contact of relay 403 and moves immediately over position 5 into position 6 in which the power magnet 431 is maintained energized and the brush carriage is restored to its position of rest without the test relay 434 testing the terminals. When the contact 439 is closed, relay 432 is energized and sequence switch 420 moves out from position 6 and completes its rotation.

If the release is extended to the second group selector after a connection with the terminals of a free final has been obtained and sequence switch 450 has left position 1 through the closure of the fundamental circuit in the register set, relay 452 remaining deenergized for a longer interval enables sequence switch 450 to pass over positions 2 and 5 and to disconnect resistance 442 before the sequence switch 420 of the second group selector leaves position 15, and terminal 412 is given free, so that the high resistance relay 443 hinders the connection of another second group selector until sequence switch 450 has completed its operation and reaches position 1.

When a release is started and the fundamental circuit is opened at the time the brush carriage of a final selector is rotating under the control of the register set along the terminals of the subscribers' lines, it is essential that during the release a subscriber's line shall not be disturbed through sequence switch 450 completing its rotation. Sequence switch 420 at such a premature release is always advanced over position 15 before sequence switch 450 reaches position 11, so that relay 462 is deenergized through opening of the front contact of relay 443 and the brush carriage of the final selector is restarted in position 11 of the sequence switch in the same manner as has been described in the case of the calling line being found busy. In this way the release of the sequence switch of a final selector is accomplished without disturbing the subscriber's line on which the brushes may happen to stay, whenever the release is started before the selection under the control of the register set is completed.

Of special importance are releases during the progress of a selection over a two-wire trunk line to a distant exchange. The fundamental circuit at the register set may be opened during the time sequence switch 520 is in position 2 and sequence switch 350 on the register set is in position 6. The fundamental circuit is opened immediately and relay 357 is energized in a circuit over sequence switch contact 376 bottom and front contact of relay 339. This determines the moment of opening of the fundamental circuit independent of the position of sequence switch 320. Sequence switch 520 on the incoming end of the trunk line, when started from position 2 will reach position 5 before sequence switch 350 leaves position 6, unless the restoration of registers 120 and 110 has been already completed, because the circuit for registers 120 and 110 and sequence switch contact 350 is held opened at the back contact of relay 359 until sequence switch 320 reaches position 15 and closes contact 343 bottom. Relay 523 is deenergized when sequence switch 520 reaches position 5 and relay 522 is energized in the circuit over sequence switch contact 509 top and back contact of relay 523. Sequence switch 520 is energized over front contact of relay 522, leaves position 5 and moves into position 6 in which relay 532 is energized over contact 539, maintaining the energization of sequence switch 520 which completes its rotation. If the subscriber has completed the dialling but the selection has been delayed at the first group selector and the release is started at the moment sequence switch 320 is in position 15, while sequence switch 350 is in position 6, sequence switch 520 does not reach position 5 before contacts 358 top and 356 top of sequence switch 350 are closed. Relay 523 on the second group selector is thereby energized and the brush carriage can start to rotate. The sequence switch 350 leaves position 9 and relay 523 becomes deenergized before the brushes are able to reach the first terminal. Sequence switch 520 will then be energized, as has been described, and moved into position 6 in which the brush carriage is restored to its position of rest.

When the release starts at some later time during which the brush carriages of the second group selector are rotating, the deenergization of relay 523 through sequence switch 350 leaving position 9 may happen at the instant a free terminal of a final selector is reached. Relay 534 becomes energized and the terminal is made busy. Sequence switch 520 is arrested in position 10. The energization of relay 452 of the final selector over the passing contact 517 of the sequence switch 520 prevents a hanging up of this sequence switch, in that sequence switch 450 of the final selector starts from position 1 and in passing positions 2 and 5 disconnects resistance 442 and causes relay 532 to deenergize. Sequence switch 520 starts from position 10 and the second group selector is released. The energization of relay 224 of the cord is at such a release slightly delayed in that relay 222 is maintained energized over contact 380 of sequence switch 350, left-hand back contact of relay 378 and sequence switch contact 369 until sequence switch 350 passes position 12. This makes it certain that the outgoing end of a two-wire trunk is maintained busy until the sequence switch of the final selector has passed position 5 so that relay 452 could not be energized over the two-wire trunk line and the fundamental circuit of a new call.

When the dial at the subscriber's station is set up to a higher number than the capacity of the exchange, and the first figure dialled is different from Figures 1 or 2, the register 100 in the exchange takes a position different from position 9 or 0. If the subscriber does not notice his mistake he obtains a connection in the exchange over a special line with the supervisory operator who calls the attention of the subscriber to the error made. If register 100 takes a position different from positions 9 or 0, sequence switch 350 cannot start from position 1 after sequence switch 320 reaches position 6 since the circuit for the energization of sequence switch 350 is maintained opened at contact 103 of register 100. The other registers are moreover prevented from receiving impulses from the stepping relay 325 through opening of contact 105 on register 100, and these registers remain in position 0, and after each series of impulses from the dial, relay 334 is energized and the sequence switch 320 is advanced to its next position. After the subscriber completes the dialling and sequence switch 320 moves into position 14, sequence switch 350 is energized in a circuit over contact 352, back contact of relay 353 and contact 341 bottom of sequence switch 320. Sequence switch 350 starts from position 1 and moves into position 3. The fundamental circuit is then closed to the first group selector and its trip spindle when rotating controls the re-setting of register 100 and the selecting of a level corresponding to the first figure dialled. Since the following registers are in their 0 position a number is selected consisting of four figures of which the first is the same as the first figure dialled and the remaining figures are 0.

Figure 8:
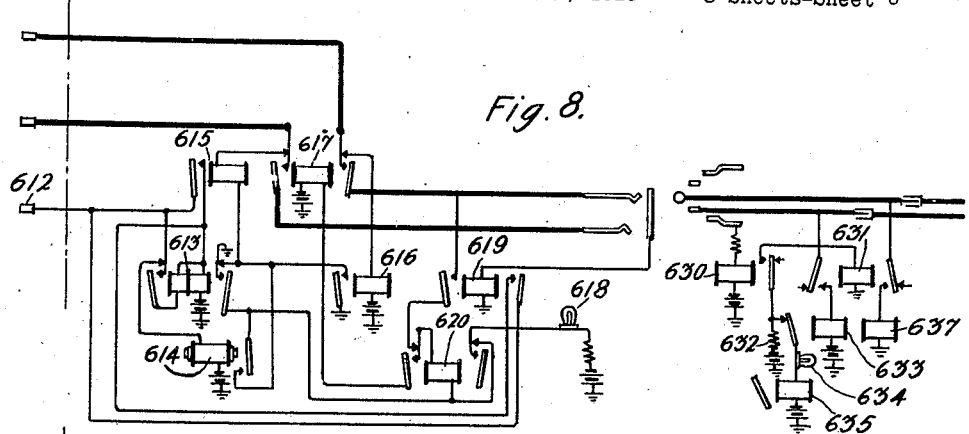
Figure 8 shows a trunk line extending to a recording or a toll operator's position.

For obtaining a connection with a recording or a toll operator in the manual toll board the subscriber in the automatic exchange dials a predetermined number consisting of three figures. The subscriber dials the number 292, register 100 takes the position 9, register 110 takes the position 1 and register 120, position 8. When sequence switch 320 reaches position 6 and sequence switch 350 is started from position 1, as has been described, relay 378 is energized in a circuit over sequence switch contacts 351 and 371 bottom and contact 117 of register 110. Relay 378 provides a holding circuit for its winding over its left-hand front contact and sequence switch contact 369 top. When the fundamental circuit is first closed in position 3 of sequence switch 350 the trip spindle of the first group selector is advanced to a position according to the positions of registers 110 and 100. The first group selector finds a free trunk line and the trip spindle of the second group selector provides the restoration of registers 120 and 110 to their 0 position. The second group selector then searches for a free trunk such as shown in Figure 8. Sequence switch 350 is thereby advanced into position 10 regardless of the position of sequence switch 320, and the circuit for the energization of sequence switch 350 is closed from battery through the winding of sequence switch magnet 350, contact 352, top, contact and right-hand armature of relay 353, front contact and right-hand armature of relay 378, contact 379, bottom, to ground.

As soon as the brushes of the second group selector reach a free trunk line, test relay 434 is energized over terminal 612, left-hand back contact of relay 613 and winding of relay 614. Sequence switch 420 of the second group selector is started from position 5 and moves into position 10, while relay 614 is energized and provides on its front contact a circuit for lamp 618 including right-hand back contacts of relays 613 and 620. Lamp 618 lights. In position 10 of sequence switch 420 a metallic circuit is established including relays 615 and 616 of Figure 8 and relays 377 and 355 at the register set, the shunt around the winding of relay 377 being removed at the back contact of relay 378. The high resistance winding of relay 377 prevents the operation of relays 615 and 616 and relay 377 provides a circuit for the energization of relay 339 over front contact of relay 377 and contacts 370 top of sequence switch 350. On the deenergization of relay 222 of the cord through opening of its circuit at the back contact of relay 339 sequence switch 220 of the cord is advanced from position 9 into position 10 whereby relay 325 in the register set is deenergized and sequence switch 320 continues its rotation and when reaching position 15 causes the energization of sequence switch 350 over contact 342 of sequence switch 320. Sequence switch 350 is moved over positions 12 and 15 into position 16. The tens register is in position 1, having been energized in completing one step when the circuit on the subscriber line was closed after the third series of impulses on the dial. Register 130 is thereby restored to its 0 position, as has been described, sequence switch 350 starts from position 16 and moves over position 17 into position 1, after which sequence switch 320 is also moved into position 1.

When the sequence switch of the cord reaches position 10, relay 262 is energized in a circuit over contact 256 of sequence switch 220, contact 415 of sequence switch 420, left-hand back contact of relay 617, winding of relay 615 and back contact of relay 613. A further circuit is established for the energization of relay 616 over right-hand back contact of relay 617, contact 416 of sequence switch 420, contact 255 of sequence switch 220, retardation coil 257 and front contact of relay 231. The energization of relay 262 prevents sequence switch 220 from moving out of position 10. The energized relay 615, connects, over its front contact, the right-hand winding of relay 613 in parallel to relay 614. Relay 613 when energized disconnects on its left-hand back contact relay 614 and maintains over its right-hand front contact the circuit for the calling lamp 618. The disconnection of the ground at the right-hand back contact of relay 613 does not interfere with the circuit of relays 262 and 615 since relay 615 is now connected over front contact of relay 616 direct to ground. Since the energization of relay 616 could be delayed through a slow operation of relay 231 over a long subscriber line, the connection of relay 615 with ground is temporarily maintained over front contact of relay 613 and front contact of slow falling off relay 614.

The operator brings the answering plug shown in Figure 8—of a toll cord into the jack of the trunk. The trunk circuit undergoes thereby a change which enables the operator to control the release of the switches in the automatic exchange. In order to make it certain that the changeover in the circuit of the trunk lines does not take place until the plug is fully inserted in the jack, so that occasionally closures and openings by the manipulation of the plug do not influence the automatic switches, the changeover in the trunk line circuit takes place after the ring of the plug has been brought in contact with the long spring of the jack. A circuit is first established over relay 619, the sleeve of the jack and relay 630 in the toll cord. Relay 630 when energized provides the energization of relay 631 over front contact of relay 630 and resistance 632, in parallel to which is also connected over back contact of supervisory relay 633 the clearing-out lamp 634 and the pilot relay 635. Relay 631 connects the supervisory relay 633 and retardation coil 637 in bridge to the trunk. Relay 619 when energized provides over its right-hand front contact a shunt around the front contact of relay 615. Over the left-hand contact of relay 619 a circuit is closed for the energization of relay 620 including front contact of relay 613, left-hand back contact of relay 620, left-hand front contact of relay 631 and winding of relay 633. Relay 620 when energized disconnects its winding from the circuit including the spring of the jack and provides for its winding a holding circuit over the winding of relay 617, which relay is thereby energized and disconnects relays 615 and 616 from the trunk line. The trunk line is now connected over the windings of relays 633 and retardation coil 637. Relay 262 is now maintained energized in a circuit over the tip of the plug. On the right-hand back contact of relay 620 the calling lamp 218 is disconnected.

If the subscriber is requiring a long distance connection the operator fills out a ticket and after the subscriber restores the receiver, withdraws the plug from the jack. If a connection is required with a short haul trunk line, the operator completes this connection with the connecting plug belonging to the answering plug used. Sequence switch 220 remains during the conversation in position 10 and the calling subscriber cannot control the release, though he is able to transfer a supervisory signal to the operator. In restoring the receiver relay 231 in the cord of the automatic exchange is deenergized and causes the deenergization of relay 633 at the toll cord. When the operator withdraws the plug, relay 619, at the trunk line, and relay 262 in the cord are deenergized. The deenergization of relay 619 removes the shunt around the left-hand high resistance winding of relay 613 which is connected over the left-hand front contact of this relay with terminal 612. Relay 262 provides over its back contact the circuit for the energization of sequence switch 220 which starts from position 10. In position 11, relay 224 is energized over back contact of relay 231 and prevents the metering. Sequence switch 220 completes its rotation, as has been described. After the operator withdraws the plug from the trunk line, relay 613 remains energized until the sequence switch of a second group selector moves over position 15; the energization of relay 620 is thereby maintained and the calling lamp 618 is maintained disconnected until the second group selector has freed the outgoing end of the trunk. If the calling subscriber gives up the call before the operator has answered, the deenergization of relay 231 in the cord causes the deenergization of relay 616 in the trunk line. After the front contact of relay 616 is opened, relay 262 in the cord and relay 615 in the trunk are deenergized. The cord is then released.

When a connection with a trunk line to the recording position is made from a distant automatic exchange, a second group selector on the incoming end of a two-wire trunk line, as shown in Figure 7, is used instead of the second group selector shown in Figure 5. The sequence switch 520 of this selector remains during the connection in position 10, providing a metallic through connection. During the time the second group selector is searching for a connection with a free trunk line to the recording position, relay 523 is maintained energized in a metallic circuit over relay 377 of the register and the sequence switch 350 of the register can advance from position 9 after a free trunk line to the recording position has been found. The operation is the same as has been described for a connection with another subscriber line over a two-wire trunk. Sequence switch 350 advances to position 10 after sequence switch 520 leaves position 5. Sequence switch 520 is held in position 10 until the operator withdraws the plug and the deenergization of relay 619 removes the shunt around the high resistance winding of relay 613. Relay 532 is deenergized. When sequence switch 520 reaches position 15 relay 523 is deenergized since the sequence switch of the cord has in the meantime passed over position 12. The second group selector is released, as has been described.

Figure 9:
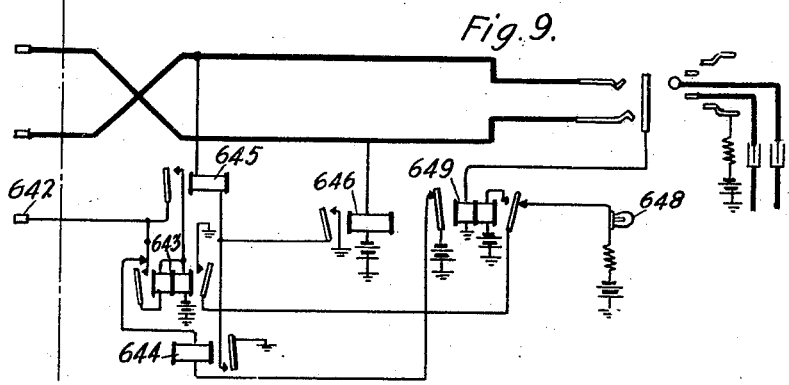
Figure 9 shows a trunk line extending to the information desk, complaint desk, wire chief's desk, etc.

For a connection with the information desk a circuit is used such as shown in Figure 9. For the selection of such a trunk line the subscriber dials the number 294 and the connection is obtained over the same level of the first group selector and another level of the second group selector. On a connection with information, complaint, wire chief, etc., it is necessary to prevent the subscriber from releasing the connection, and relays 645 and 646 corresponding to relays 615 and 616 on Figure 9 are maintained in bridge to the connection. The sequence switch 220 of the cord is in the same manner as has been described, held in position 10 during this conversation and when relay 231 is deenergized relay 646 is also deenergized and causes the deenergization of relays 645 and 262. Relay 224 is energized in position 11 of sequence switch 220, and the left-hand high resistance winding of relay 643 is maintained energized in the circuit over terminal 642 until the second group selector is released. After an operator has once inserted a plug into the jack of the trunk, relay 649 remains energized and the calling lamp 648 is disconnected until both the plug is withdrawn and relay 643 is deenergized. If the plug is withdrawn first, relay 649 remains energized over its right-hand winding and right-hand front contact and front contact of relay 649. When the connection is released first from the subscriber station and the second group selector is given free, the trunk line still remains busy until the operator has withdrawn the plug, the circuit of relay 644 being opened at the left-hand back contact of relay 649.

Figure 10:
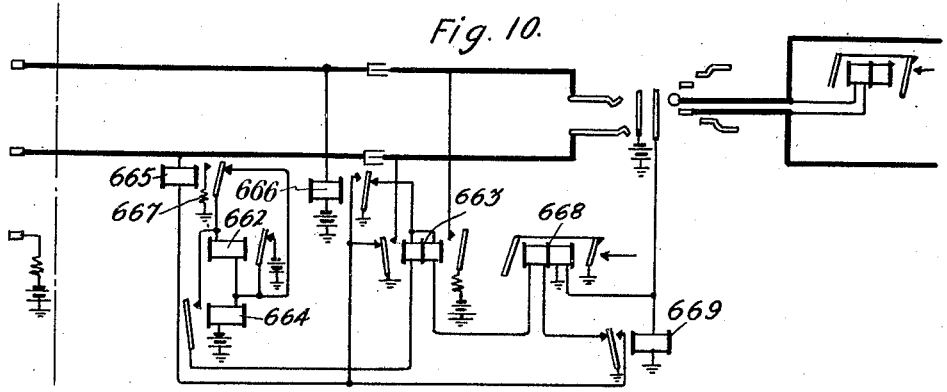
Figure 10 shows a trunk line extending to a distant manual exchange.

During the transition period of change from manual to automatic working in the telephone network when a manual exchange remains, the connection of a subscriber's line of the automatic exchange to the manual exchange is made over a two-wire trunk line as shown in Figure 10. In the circuit of the register set in Figs. 2 and 3 it is assumed that the numbers in the manual exchange are beginning with the figure 1. After the subscriber's line in an automatic exchange has been connected to a free register set, the subscriber obtains a connection with the manual exchange in dialling the number 100, and the registers 100, 110 and 120 take the position 0. When sequence switch 350 starts from position 1, relay 365 is energized in a circuit over sequence switch contact 364 top, contact 414 of register 110, contact 104 of register 100, sequence switch contacts 363 top and 351. Relay 365 maintains its energization over its left-hand front contact and sequence switch contact 369, and provides at its right-hand front contact the removal of the short-circuiting around winding of relay 377.

When the fundamental circuit is first closed in position 3 of sequence switch 350 the trip spindle of the first group selector is advanced one step and the group selector obtains a connection in the upper terminal row with a free trunk line as shown in Figure 10. In position 6 of sequence switch 350 the fundamental circuit is closed independent of contact of relay 357 over wire 296, sequence switch contact 358 bottom winding of relay 355, right-hand front contact of relay 365, sequence switch contact 356 bottom, winding of relay 377 to wire 297. On the incoming end of the trunk line the fundamental circuit is closed over relays 666 and 665, and back contact of relay 663. Relays 666 and 665 remain deenergized whereas relay 377 is energized and causes the energization of relay 339 in the circuit over contact 370 top of sequence switch 350 and front contact of relay 377. The register set is released as has been described, and sequence switch 220 of the cord moves into position 10; relay 666 is energized over one wire of the trunk line and front contact of relay 231, and relays 665 and 262 are energized over the second wire of the trunk. Relay 262 prevents the advance of sequence switch 220 of the cord from its position 10. Relay 665 provides a circuit for the energization of the slow-acting relay 662 over resistance 667, front contact of relay 665 and back contact of relay 662. When relay 662 leaves its back contact the shunt around the winding of the slow-acting relay 664 is removed and this relay is also energized. The circuit is then extended over front contact of relay 664, both windings of the differentially wound relay 663, left-hand winding of drop 668 and back contact of relay 669. The drop 668 is operated. When the operator at the magneto board brings an answering plug into the jack, relay 669 is operated and drop 668 is restored.

When the calling subscriber in the automatic exchange restores his receiver on the hook relay 231 in the cord is deenergized and in consequence relay 666 at the incoming end of the trunk line. The left-hand winding of relay 663 is brought in series with the windings of relays 664 and 662 over back contact of relay 666. Relay 663 is energized and connects over its front contacts the battery in bridge to the springs of the jack, operating thereby the clearing-out drop in the cord of the magneto board. The connection in the automatic exchange is released after the operator in the manual exchange withdraws the plug and relay 669 is deenergized. The connection of the front contact of relay 669 to ground over back contact of relay 663 has been already removed and in opening of front contact of relay 669 relays 665 and 262 are deenergized. Sequence switch 220 of the cord in the automatic exchange starts from its position 10. In position 11 relay 224 is energized and the release is completed as described. When relay 665 closes its back contact the winding of relay 662 is short-circuited and this relay is slowly deenergized. After relay 662 closes its back contact the winding of relay 664 is short-circuited and this relay is slowly deenergized and after opening its front contact disconnects relay relay 663. If the deenergization of relays 662, 663 and 664 in succession takes place before sequence switch 220 in the exchange has left its position 12, relay 665 could become energized a second time over back contact of relay 663. Relays 662, 663 and 664 in succession could be energized while the winding of the drop 668 remains short-circuited at the back contact of relay 666. Such a repeated play of the slow-acting relays in the incoming end of the trunk does not therefore interfere with the operation and enables the use of slow-acting relays which need not provide excessive long times for their operation.

Figure 3:
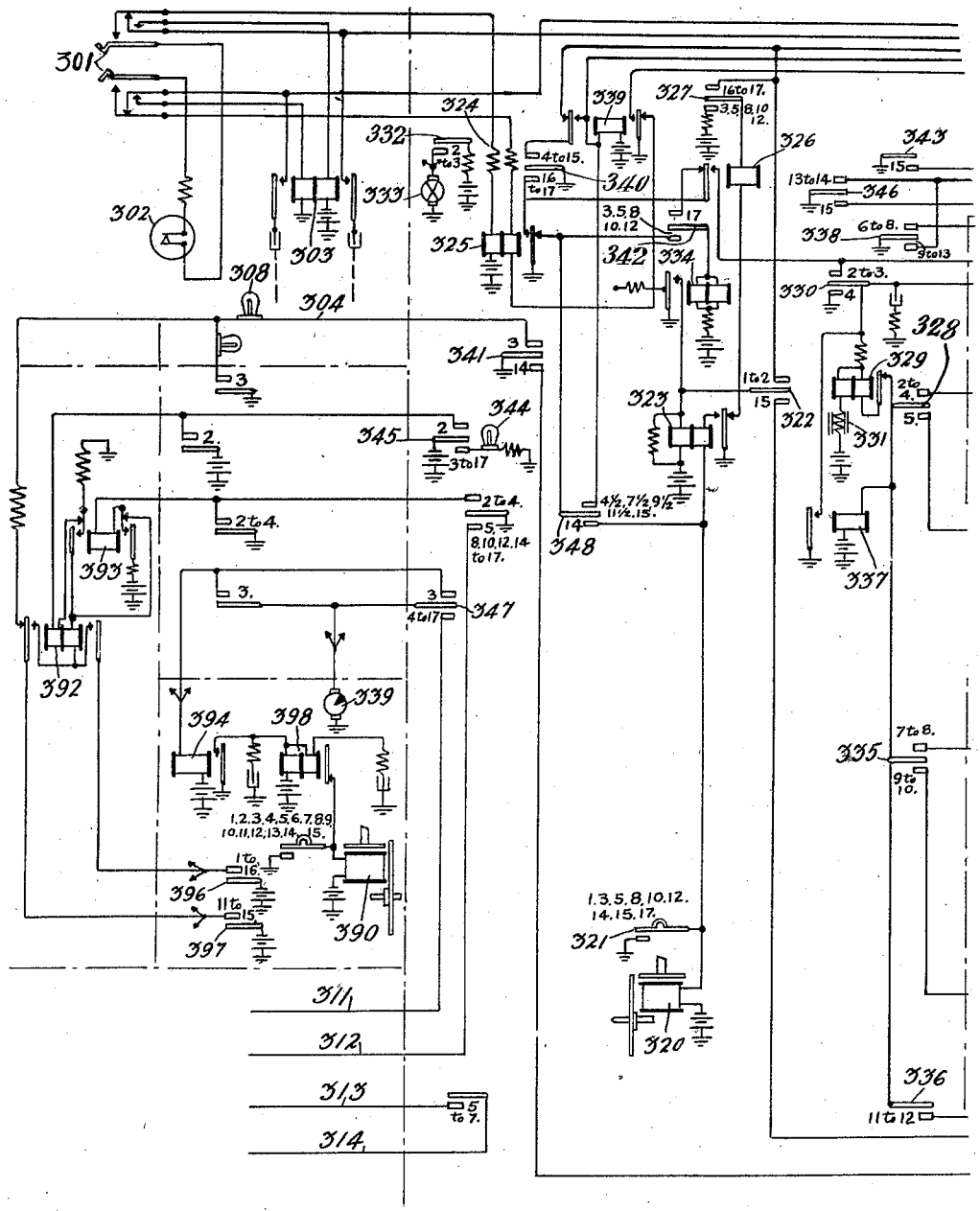
Figures 3 and 4 show a register set and a common arrangement for the timely delay of a monitoring signal.
Figure 4:
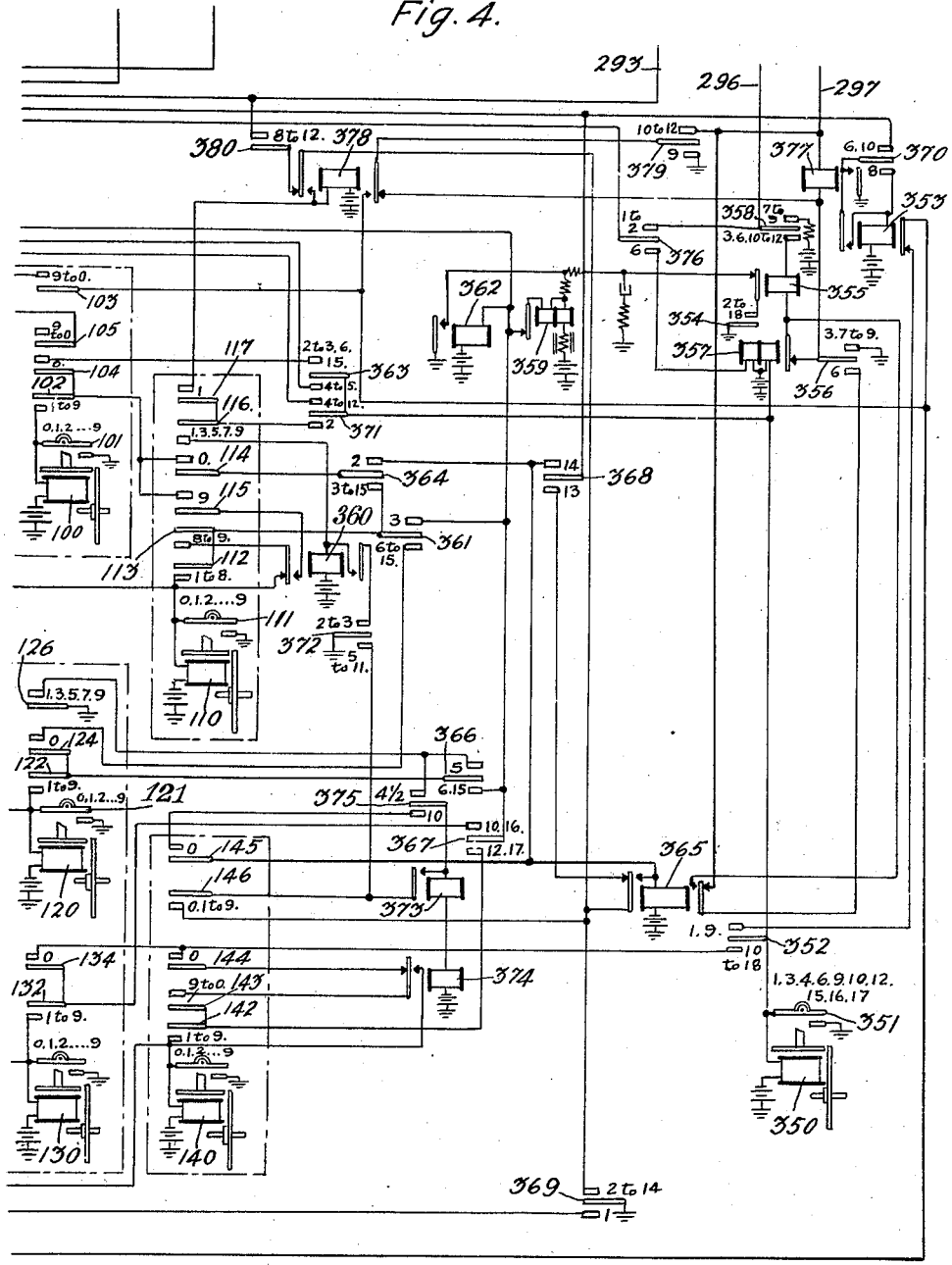

Each register set is provided with a key 301 at the complaint operator's position and a subscriber who is unable to control the registers due to a disturbed dial etc., is able to obtain a connection with the complaint desk by removing the receiver from the hook and waiting some time after he receives the dialling tone. A common timing arrangement for delayed signals is provided in the exchange as shown in Figure 3. When sequence switch 320 passes position 2, a circuit is temporarily established over contact 345 top of sequence switch 320, for the left-hand windings of relay 392 which is energized. Relay 392 provides a circuit for relay 393 which is thereby energized. On the left-hand front contact of relay 393 the right-hand winding of relay 392 is maintained energized. Relay 394, common to a large number of register sets, is connected in a circuit over contact 347 of sequence switch 320 to a common interrupter 399. Relay 394 is energized each time the interrupter 399 is closed and a sequence switch 320 of a register set is in position 3. Relay 394 provides a circuit for the energization of sequence switch 390. The left-hand winding of relay 398 is connected in parallel to sequence switch 390 and the differentially wound windings of relay 398 remain deenergized until when the sequence switch 390 that starts the right-hand winding of relay 328 is short-circuited in the well-known manner. Sequence switch 390 completes slowly a cycle of operation in a predetermined length of time. The energization of relay 392 is maintained on contacts 396 and 397 of sequence switch 390 until sequence switch 390 starts from position 15 and moves into position 1. When relay 392 is deenergized a circuit is prepared for the complaint lamp 308 individual to the register set. The closing of this circuit is delayed until sequence switch 390 again reaches position 11 and contact 397 is again closed. The lighting of the lamp 308 before the complaint operator is therefore delayed for a time equal at least to the time sequence switch 390 needs to move from position 15 into position 11. The operator noticing lamp 308 lighted depresses key 301 and communicates with the sub-subscriber, the register meanwhile being maintained undisturbed. If the line or register equipment is in trouble she can either directly notify the trouble man or in operating once her dial cause the advance of sequence switch 320 to position 5 in which a common time alarm circuit is brought in connection with the register set over wires 311, 312, 313 and 314. If the complaint operator finds that the subscriber is not able to set up the register, she sets up the register set according to the wanted number from her dial and restores key 301. The registers then control the setting up of the switches for the connection and relay 325 is maintained energized over the subscriber line after key 301 is restored. When the selection is completed the register set is released and the sequence switch of the cord is advanced into the position of a through connection which remains under the control of the calling subscriber,

What is claimed is:

1. In a telephone system, a trunk line, a selective switch in which said trunk terminates, a controlling mechanism including a plurality of registers, a control circuit including said trunk line extending from said mechanism to the selective switch, a second selective switch, means controlled by one of said registers over said circuit for operating the first selective switch to extend said trunk line to said second switch, means for associating the control circuit with another of said registers, means operated when said first switch reaches a certain stage in its operation for delaying the association of said second register with the control circuit, means operated when the first switch reaches a further stage in its operation for rendering said delaying means ineffective, and means operated when the second register becomes associated with the control circuit for completing said control circuit to said second switch.

2. In a telephone system, a trunk line, a selective switch in which said trunk terminates, a controlling mechanism including a plurality of registers, a control circuit including said trunk line extending from said mechanism to the selective switch, a second selective switch means controlled by one of said registers over said circuit for operating the first selective switch to extend said trunk line to said second switch, means for associating the control circuit with another of said registers, means operated when said first switch reaches a certain stage in its operation for delaying the association of said second register with the control circuit, means operated when the first switch reaches a further stage in its operation for rendering said delaying means ineffective, means operated when the second register becomes associated with the control circuit for extending said control circuit to said second switch, and means controlled by said second register over the control circuit for operating said second switch.

3. In a telephone system, a trunk line, a selective switch in which said trunk terminates, a multi-position auxiliary switch for controlling the operation of said selective switch, a controlling mechanism comprising a plurality of registers, a control circuit including said trunk line extending from said mechanism to the selective switch, a second selective switch, means controlled by one of said registers over said circuit for operating the first selective switch to extend said trunk line to said second switch, means for associating the control circuit with another of said registers, means operated when the auxiliary switch reaches a certain position for delaying the association of said second register with the control circuit, means operated when the auxiliary switch reaches a certain other position for rendering said delaying means ineffective, and means operated when the second register becomes associated with the control circuit for advancing the auxiliary switch to extend said control circuit to the second selective switch.

4. In a telephone system, a trunk line, a selective switch in which said trunk terminates, a controlling mechanism comprising a plurality of registers, means for variably setting said registers, a control circuit including said trunk line extending from said mechanism to the selective switch, a second selective switch, means controlled by one of said registers over said circuit for operating the first selective switch to extend said trunk line to said second switch, means rendered effective when said registers have been set for associating the control circuit with a second one of said registers, means operated when said first switch reaches a certain stage in its operation for delaying the association of said second register with the control circuit, means operated when the first switch reaches a further stage in its operation for rendering said delaying means ineffective, and means operated when the second register becomes associated with the control circuit for extending said circuit to the second selective switch.

5. In a telephone system, a selective switch, a register controlling mechanism for storing designations, means for variably setting said mechanism, means controlled in accordance with the settings of said mechanism for operating the selective switch to extend a plurality of different classes of talking connections, and a multi-position auxiliary switch for controlling the operation of said selective switch, said auxiliary switch being arranged to assume one of a plurality of positions dependent upon the class of the connection being extended.

6. In a telephone system, a subscriber's line, an operator's position, a selective switch, a register controlling mechanism for storing designations, means for variably setting said mechanism, means controlled in accordance with the setting of said mechanism for operating the selective switch to extend the talking connection through to the subscriber's line or to the operator's position, and a multi-position auxiliary switch for controlling the operation of said selective switch, said auxiliary switch being arranged to assume one of two positions dependent upon the talking connection extended.

7. In a telephone system, a selective switch, means for operating said switch to extend a plurality of different classes of talking connections, means for releasing the selective switch, and a multi-position auxiliary switch for controlling the selective and release movements of said selective switch, said auxiliary switch being arranged to assume one of a plurality of talking positions dependent upon the class of the connection extended.

8. In a telephone system, a selective switch, a register mechanism at the central office for storing designations, means for operating said switch to extend a plurality of different classes of talking connections, an auxiliary switch having a plurality of positions coacting with said register mechanism for controlling the operation of said selective switch, and means rendered effective in the operation of the selective switch for successively advancing said auxiliary switch from one position to another, said auxiliary switch being arranged to assume one of a plurality of different talking positions dependent upon the class of the connection extended.

9. In a telephone system, a selective switch, a register mechanism at the central office for storing designations, means for operating said switch to extend a plurality of different classes of talking circuits, a multiposition auxiliary switch for coacting with the register mechanism for controlling the operation of said selective switch, said multiposition switch having a separate talking position for each of said different classes of talking circuits, means actuated by said auxiliary switch in its respective positions for closing said talking circuits, and means for moving said auxiliary switch into the particular talking position corresponding to the class of the talking circuit extended.

10. In a telephone system, a selective switch, a plurality of called lines of different classes, means for operating said switch to extend a talking connection to any one of said called lines, a register mechanism at the central office for recording number designations, a multi-position auxiliary switch coacting with the register mechanism for controlling the operation of said selective switch, said auxiliary switch having a separate talking position for each class of said called lines, means for moving the auxiliary switch into one talking position when connection is extended to a called line of one class, and means for moving the auxiliary switch into another talking position when connection is extended to a called line of another class.

11. In a telephone system, a selective switch, means for operating said switch to extend a plurality of different classes of talking connections, a multi-position auxiliary switch for controlling the operation of said selective switch, said auxiliary switch being arranged to assume one of a plurality of talking positions dependent upon the class of the connection extended, means for releasing said selective switch controlled by the auxiliary switch in a certain one of its positions, and means for moving said auxiliary switch from any of said talking positions into its release control position.

12. In a telephone system, a selective switch, means for operating said switch to extend a plurality of different classes of talking connections, a register controlling mechanism at the central office for storing designations, an auxiliary switch having a plurality of successive talking positions coacting with the register mechanism for completing said talking connections, means operated upon the completion of the operation of said selective switch for advancing the auxiliary switch into one of said talking positions, and means for advancing the auxiliary switch into a subsequent talking position if the connection extended is one of a certain class.

13. In a telephone system, a selective switch, means for operating said switch to extend a plurality of different classes of talking connections, a register mechanism at the central office for storing designations, an auxiliary switch coacting with the register mechanism for controlling the operation of said selective switch and having a plurality of talking positions, means for moving the auxiliary switch into a given one of its talking positions, said auxiliary switch remaining in such position if the connection extended is one of a certain class, and means for advancing the auxiliary switch into another talking position if the connection extended is one of a different class.

14. In a telephone system, a plurality of called lines of different classes, a selective switch, a register mechanism at the central office for storing designations, means for operating said switch to extend a talking connection to any of said called lines, a multi-position auxiliary switch coacting with said register mechanism for controlling the operation of said selective switch, said auxiliary switch having a plurality of different talking positions, one for each class of called lines, means for advancing the auxiliary switch into one of said talking positions, and means responsive to the answer on a called line of a certain class for advancing the auxiliary switch into another of its talking positions.

15. In a telephone system, a central office, a subscriber's line leading to the central office, a selective switch at the central office, a register controlling mechanism at the central office, means for setting said register controlling mechanism, means controlled in accordance with the setting of the register controlling mechanism for operating said switch to extend a plurality of different classes of talking connections, and a multi-position auxiliary switch for controlling the operation of said selective switch, said auxiliary switch being arranged to assume one of a plurality of talking positions dependent upon the class of the connection extended.

16. In a telephone system, a central office, a subscriber's line leading to the central office, a selective switch at the central office, a register controlling mechanism at the central office, means at the substation for sending impulses over the line to position the registers of said mechanism, means controlled in accordance with the setting of said registers for operating the selective switch to extend a plurality of different classes of talking connections, and a multi-position auxiliary control switch for controlling the operation of said selective switch, said auxiliary control switch being arranged to assume one of a plurality of talking positions dependent upon the class of the connection extended.

In witness whereof, I hereunto subscribe my name this 8th day of February, A. D. 1919.

LIPA POLINKOWSKY.